No. 719,267. PATENTED JAN. 27, 1903.
F. M. SLOCUM.
CIGAR PERFORATOR.
APPLICATION FILED MAR. 13, 1902.
NO MODEL.
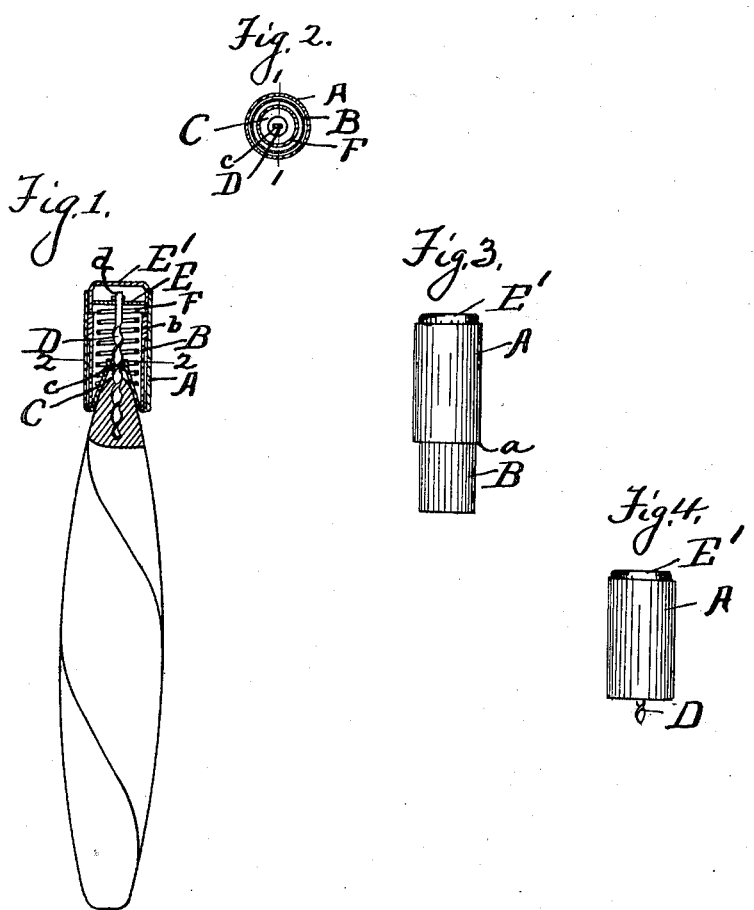

UNITED STATES PATENT OFFICE.

FITZROY M. SLOCUM, OF ERIE, PENNSYLVANIA, ASSIGNOR OF ONE-HALF TO HARRY V. ASHBY, OF ERIE, PENNSYLVANIA.

CIGAR-PERFORATOR.

SPECIFICATION forming part of Letters Patent No. 719,267, dated January 27, 1903.

Application filed March 13, 1902. Serial No. 98,106. (No model.)

*To all whom it may concern:*

Be it known that I, FITZROY M. SLOCUM, a citizen of the United States, residing at Erie, in the county of Erie and State of Pennsylvania, have invented certain new and useful Improvements in Cigar-Perforators; and I do hereby declare the following to be a full, clear, and exact description of the invention, such as will enable others skilled in the art to which it appertains to make and use the same.

This invention relates to cigar-perforators; and it consists in certain improvements in the construction thereof, as will be hereinafter fully described, and pointed out in the claims.

The object of the invention is to provide a means for perforating the ends of cigars in lieu of the ordinary method of cutting off the ends of the cigar.

The invention is illustrated in the accompanying drawings as follows:

Figure 1 shows a section of the device on the line 1 1 in Fig. 2. Fig. 2 shows a section on the line 2 2 in Fig. 1. Fig. 3 shows a side elevation of the device with the parts at normal. Fig. 4 shows a side elevation of the device with the parts in a position assumed at the completion of the perforating movement.

The device comprises the outside cylinder A, having one end crimped at $a$. Telescopically arranged in this cylinder is the cylinder B, enlarged at $b$, so as to engage the crimped edge $a$. At the end of the cylinder B is a tapered support C, fashioned to support the end of the cigar as it is being perforated. In the end of this tapered support is the nut $c$. A twist-drill D is arranged to operate in the nut $c$. The end of the drill passes through a washer E. The washer E is pressed into a thimble E' and the thimble E' pressed into the end of the cylinder A. The drill has the head $d$, which prevents its slipping out of the washer E. A spring F is tensioned against the washer E and the support C and tends to hold the cylinders A and B in the position shown in Fig. 3, or, in other words, retracts the drill through the nut $c$.

In the operation of the device the cigar is placed in the support C, as shown in Fig. 1, the parts being in the position shown in Fig. 3. The cylinder A is then pushed forwardly, thus advancing the drill through the nut $c$ into the cigar. By using a twist-drill not only is the cigar perforated, but the particles of the cigar cut away by the drill are removed by the twist in the drill. As soon as the cigar is perforated it is removed, the parts springing back to their normal position, thus retracting the drill and housing it, so that the device may be readily carried in the pocket.

What I claim as new is—

1. In a cigar-perforator, the combination of a support for the end of the cigar; a drill having a spiral thereon; a nut arranged on said drill and adapted to rotate the drill as the drill is advancing; and means for advancing said drill into the end and longitudinally of a cigar in said support.

2. In a cigar-perforator, the combination of the cylinder A; the cylinder B, telescopically arranged relatively to the cylinder A; the cigar-support C, carried by the cylinder B; the nut $c$, arranged on the support C; the thimble E', secured to the cylinder A; the drill D, rotatively secured to the thimble E', and arranged to operate in the nut $c$ in the end and longitudinally of a cigar in said support; and the spring F, housed by said cylinders, and tending to retract the drill.

In testimony whereof I affix my signature in presence of two witnesses.

FITZROY M. SLOCUM.

Witnesses:
   JUSTIN P. SLOCUM,
   G. E. YARD.